United States Patent
Gilbert

(10) Patent No.: US 11,875,505 B2
(45) Date of Patent: Jan. 16, 2024

(54) SYSTEMS AND METHODS FOR ADAPTIVE MEASUREMENT OF MEDICAL IMAGES

(71) Applicant: GE Precision Healthcare LLC, Milwaukee, WI (US)

(72) Inventor: Andrew Gilbert, Oslo (NO)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 339 days.

(21) Appl. No.: 17/163,132

(22) Filed: Jan. 29, 2021

(65) Prior Publication Data

US 2022/0245793 A1 Aug. 4, 2022

(51) Int. Cl.
G06T 7/00 (2017.01)
G06T 7/11 (2017.01)

(52) U.S. Cl.
CPC .............. G06T 7/0012 (2013.01); G06T 7/11 (2017.01); *G06T 2207/10132* (2013.01); *G06T 2207/20076* (2013.01); *G06T 2207/20084* (2013.01); *G06T 2207/30048* (2013.01)

(58) Field of Classification Search
CPC ...... G06T 7/0012; G06T 7/11; G06T 2207/10132; G06T 2207/20076; G06T 2207/20084; G06T 2207/30048; G06T 2207/20081; G06T 7/12; G06T 7/62; G06T 2207/30104; G06N 3/045; G06N 3/084

See application file for complete search history.

(56) References Cited

U.S. PATENT DOCUMENTS 11,596,382 B2 3/2023 Silberman et al.
2020/0037997 A1* 2/2020 Viggen ............... A61B 8/0883
2022/0005222 A1* 1/2022 Tanikawa ............. G06N 20/00

FOREIGN PATENT DOCUMENTS

WO WO-2012061452 A1 * 5/2012 ........... G06T 7/0012

OTHER PUBLICATIONS

Ladak et al. "Prostate Segmentation from 2D Ultrasound Images." Proceedings of the 22nd Annual International Conference of the IEEE Engineering in Medicine and Biology Society, Jul. 23, 2000, pp. 3188-3191 (Year: 2000).*
Dias et al. "CraMs: Craniometric Analysis Application Using 3D Skull Models." IEEE Computer Graphics and Applications, Nov. 2015, pp. 11-17 (Year: 2015).*
Gilbert, A. et al., "User-Intended Doppler Measurement Type Prediction Combining CNNs With Smart Post-Processing," IEEE Journal of Biomedical and Health Informatics, Oct. 7, 2020, 11 pages.

* cited by examiner

*Primary Examiner* — Jon Chang
(74) *Attorney, Agent, or Firm* — McCoy Russell LLP

(57) ABSTRACT

The current disclosure provides methods and systems for increasing an accuracy and/or suitability of an automated measurement of a medical image. In one embodiment, the current disclosure provides for a method comprising: receiving one or more user-selected measurement points for an automated measurement of an anatomical feature of a medical image from a user; predicting one or more additional measurement points for the automated measurement based on the one or more user-selected measurement points and based on a comparison of the anatomical feature of the medical image with a plurality of images of the anatomical feature via a trained network; and performing the automated measurement of the anatomical feature based at least on the one or more additional measurement points.

17 Claims, 8 Drawing Sheets

SYSTEMS AND METHODS FOR ADAPTIVE MEASUREMENT OF MEDICAL IMAGES

TECHNICAL FIELD

Embodiments of the subject matter disclosed herein relate to medical imaging, and more particularly, to systems and methods for adapting automated measurement to different user preferences.

BACKGROUND

Medical imaging, where images of anatomical features inside a body of a patient are created, is widely used for diagnostic and treatment purposes. For example, clinical ultrasound is an imaging modality that employs ultrasound waves to probe the internal structures of a body of a patient and produce a corresponding image. An ultrasound probe comprising a plurality of transducer elements emits ultrasonic pulses which reflect or echo, refract, or are absorbed by structures in the body. The ultrasound probe then receives reflected echoes, which are processed into an image. In echocardiology, ultrasound is used to generate images of a patient's heart.

Specialists in medical imaging such as ultrasound clinicians often rely on measurements between features of medical images to assist in diagnoses, including 2D B-mode measurements, Doppler measurements, area measurements, and volume measurements. Such measurements are often automatically performed based on automated measurement algorithms. However, inter-operator and intra-operator variation in measurements may lead to inaccurate automated measurement algorithms or user dissatisfaction with the automated measurement algorithms.

SUMMARY

The current disclosure at least partially addresses one or more of the above identified issues by a method comprising receiving one or more user-selected measurement points for an automated measurement of an anatomical feature of a medical image from a user; predicting one or more additional measurement points for the automated measurement based on the one or more user-selected measurement points and based on a comparison of the anatomical feature of the medical image with a plurality of images of the anatomical feature via a trained network; and performing the automated measurement of the anatomical feature based at least on the one or more additional measurement points.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
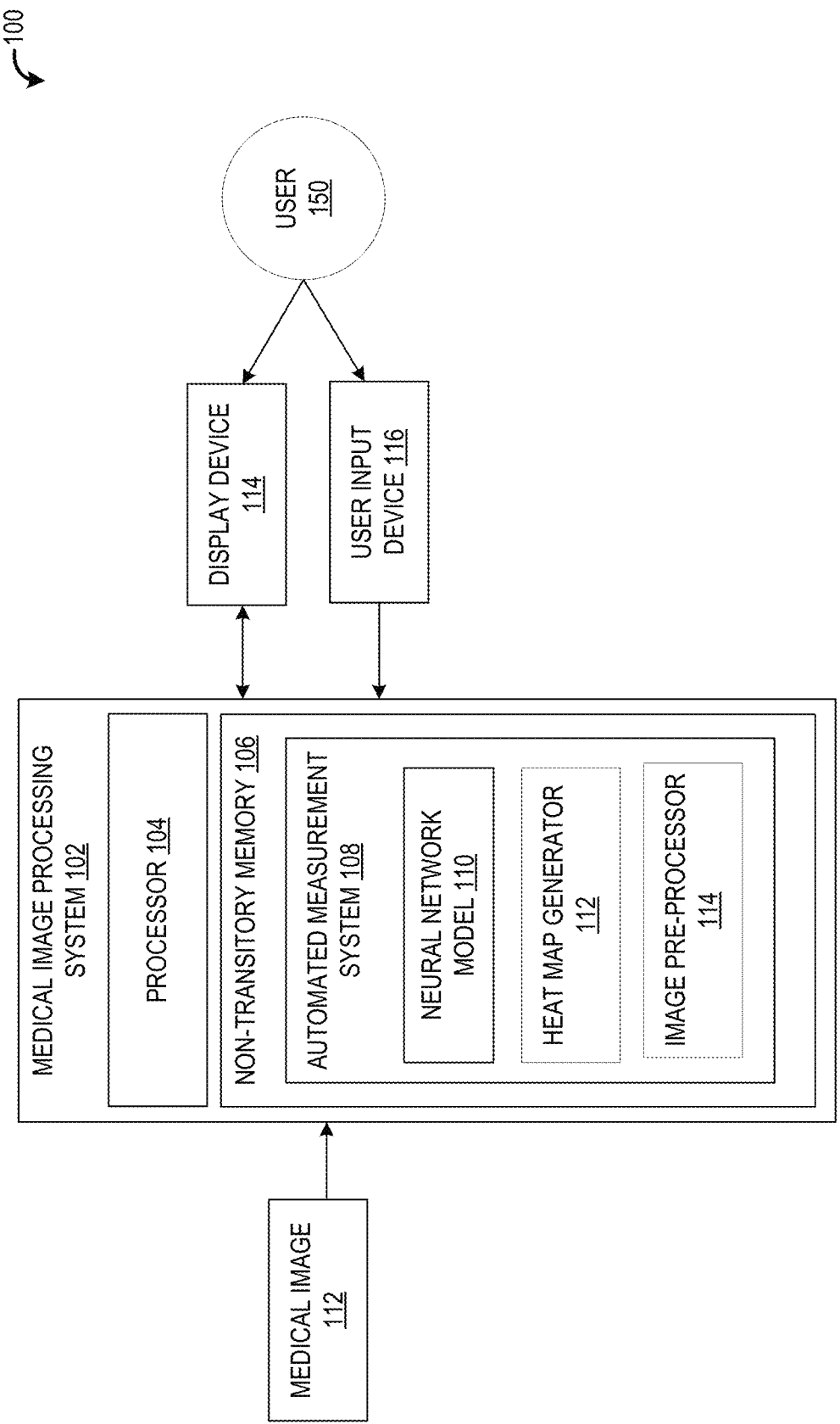
FIG. 1 shows a first block diagram of an exemplary embodiment of a medical image processing system including an automated measurement system.

For diagnostic purposes, a user of a medical image processing system may perform measurements on anatomical features of medical images. The user (e.g., an ultrasound operator, a clinician, an echocardiologist, etc.) may measure a width, length, or thickness of an anatomical feature, or a space between two anatomical features in a two-dimensional (2D) medical image. For example, in left ventricle (LV) studies, an echocardiologist may measure a thickness of a septum, a thickness of a posterior wall of an LV, and/or a distance between the septum and the posterior wall, or the echocardiologist may measure a volume of the LV, or an area of a 2D feature on a surface of the LV (e.g., a discoloration, a swelling, etc.). Additionally or alternatively, the echocardiologist may perform spectral Doppler measurements during an echocardiographic examination to analyze myocardial motion and blood flow.

To perform a measurement manually, the clinician may use calipers, where jaws of the calipers may be adjusted and placed at caliper points on the medical image. Upon placing a first jaw of the calipers at a first caliper point, and a second jaw of the calipers at a second caliper point, the calipers may indicate a measurement of a distance between the first caliper point and the second caliper point. When referring to the measurement, the first caliper point and the second caliper point may be referred to as measurement points of the measurement.

Many of these measurements may be accurately performed automatically by an automated measurement system, thereby reducing inter- and/or intra-operator variability and increasing an efficiency of diagnosis. The automated measurement system may take as an input a medical image and a type of measurement to perform on the image, may select the measurement points based on the type of measurement to be performed, and measure a distance between the measurement points. For some types of measurements, the measurement points may comprise a starting point and an endpoint of the measurement. Another type of measurement may comprise a set of component measurements (e.g., a measurement set), where the measurement points may include starting points and endpoints of each component measurement of the measurement set. For example, one type of measurement may comprise a measurement set of three distinct measurements, including a first starting point and a first endpoint of a first measurement, a second starting point and a second endpoint of a second measurement, and a third starting point and a third endpoint of a third measurement. In some examples, an endpoint of one measurement may also be a starting point of another measurement. For example, the first endpoint may be the second starting point, the second endpoint may be the third starting point, and so on. In one example, the automated measurement system may rely on one or more neural networks that are trained to predict the measurement points from the medical image and the measurement type (e.g., after training on a set of previously measured medical images).

However, for many types of measurements, established guidelines may leave room for interpretation in regard to a positioning of the starting point and/or other measurement points, and different clinicians may be trained to or may prefer to perform the type of measurement in different ways. For example, a first expert may have been trained to measure an anatomical feature from a first starting point to a first endpoint, while a second expert may have been trained to measure the anatomical feature from a second starting point to a second endpoint, where the first starting point and/or the first endpoint are different from the second starting point and/or the second endpoint. Further, when an anatomical feature is deformed, the first expert and the second expert may have different approaches to performing a measurement of the anatomical feature, where the different approaches may include selecting different starting points and/or endpoints of the measurement. If a neural network is trained using training data (e.g., medical images with measurements) that consistently measures the anatomical feature from the first starting point to the first endpoint, the first expert may be satisfied with the measurement, while the second expert may not be satisfied with the measurement. If the neural network is trained using training data that consistently measures the anatomical feature from the second starting point to the second endpoint, the second expert may be pleased with the measurement, while the first expert may not be pleased with the measurement. If the neural network is trained using training data that does not measure the anatomical feature consistently from either the first starting point or the second starting point, a performance of the neural network may not be satisfactory. If a measurement is obtained from the automated measurement that differs from an expectation of a clinician, a diagnosis of a patient based on the measurement may be less accurate.

The current disclosure provides systems and methods for performing an automated measurement of a medical image in a semi-automatic mode, where the user may select one or more of the measurement points for performing the automated measurement, and the automated measurement system selects additional measurement points used to perform the measurement. In this way, the automated measurement system "autocompletes" a selection of measurement points based on user input. In one example, the user selects the starting point to perform the automated measurement, and the automated measurement system predicts a corresponding endpoint from the selected starting point. In another example, the automated measurement system predicts one or more starting points and one or more endpoints, and prompts the user to accept a resulting measurement based on the measurement points, or manually adjust one or more of the measurement points to repeat the automated measurement with the adjusted measurement points. In other examples, the user may be prompted to select one or more measurement points on a boundary of an anatomical feature when performing a segmentation of the anatomical feature, and the automated measurement system may predict additional segmentation measurement points to perform the segmentation from the user-selected measurement points. If the user wishes to select a different measurement point than a predicted measurement point, the user may adjust the predicted measurement point on the image.

In one embodiment, an anatomical feature of a medical image is measured using an automated measurement system of a medical imaging system, such as the medical imaging system 100 of FIG. 1. The automated measurement system may be used by a user of the medical imaging system in accordance with the automated measurement system flow diagram 200 of FIG. 2. The automated measurement system may include one or more neural networks, such as a convolutional neural network (CNN), which may be trained to generate one or more measurement points of the anatomical feature based on one or more user-selected measurement points of the anatomical feature. An example set of measurement points on the anatomical feature generated from a first user-selected starting point is shown in FIG. 3A. An alternative user-selected starting point may be used the event of a deformity of the anatomical feature, such as the deformity shown in FIG. 3B. Alternative starting points may reflect different measurement styles, as shown in FIG. 3D based on different starting points such as the starting points shown in FIG. 3C. Measurement points along a boundary of the anatomical feature may also be generated from a starting point during a segmentation task, as shown in FIGS. 4A and 4B. The automated measurement system may perform a measurement in accordance with the procedure described in FIG. 5, based on measurement points that are predicted in accordance with the procedure described in FIG. 6. The CNN may be trained to generate measurement points from the user-selected starting point according to the procedure described in FIG. 7.

Referring to FIG. 1, an exemplary block diagram 100 shows an example medical image processing system 102, in accordance with an embodiment. The medical image processing system 102 may be operated within or as part of a larger medical imaging system, such as an ultrasound imaging system where ultrasound images are acquired via an ultrasound probe, or the medical image processing system 102 may be an independent system used to view and/or process medical images that have been previously acquired by a separate medical imaging system. For example, the previously acquired medical images may be stored in a database on a server accessible to the medical image processing system 102 via a wired or wireless service (e.g., a cloud-based server). The medical image processing system 102 may take as input one or more of a medical image 112 from the medical imaging system or from the database.

In one example, the medical image 112 is selected by a user 150 for display on a display device 114 and/or for processing via a user input device 116. Display device 114 may include one or more display devices utilizing virtually any type of technology. In some embodiments, display device 114 may comprise a computer monitor. User input device 116 may comprise one or more of a touchscreen, a keyboard, a mouse, a trackpad, a motion sensing camera, or other device configured to enable a user to interact with and manipulate data within medical image processing system 102. The user may use the user input device 116 to initiate and/or interact with one or more image processing routines of the medical image processing system 102. For example, the user may wish to adjust a property of the ultrasound image (e.g., a contrast, brightness, etc.), mark or label an anatomical feature of the ultrasound image, or annotate the ultrasound image. Additionally and/or alternatively, the user may wish to perform one or more automated tasks on the ultrasound image and/or the anatomical feature of the ultrasound image, such as an automated measurement task (e.g., to perform a measurement of the anatomical feature) or an automated segmentation task (e.g., to define a boundary of the anatomical feature), or another automated task.

Medical image processing system 102 includes a processor 104 configured to execute machine readable instructions stored in a non-transitory memory 106. Processor 104 may generally include any number of microprocessors, ASICs, ICs, etc. Processor 104 may be single core or multi-core, and the programs executed thereon may be configured for parallel or distributed processing. In some embodiments, the processor 104 may optionally include individual components that are distributed throughout two or more devices, which may be remotely located and/or configured for coordinated processing. In some embodiments, one or more aspects of the processor 104 may be virtualized and executed by remotely-accessible networked computing devices configured in a cloud computing configuration.

In some embodiments, the non-transitory memory 106 may include components disposed at two or more devices, which may be remotely located and/or configured for coordinated processing. In some embodiments, one or more aspects of the non-transitory memory 106 may include remotely-accessible networked storage devices configured in a cloud computing configuration. The non-transitory memory 106 includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

Display device 114 may be combined with processor 104, non-transitory memory 106, and/or user input device 116 in a shared enclosure, or may be peripheral display devices and may comprise a monitor, touchscreen, projector, or other display device known in the art, which may enable a user to view medical images and/or interact with various data stored in non-transitory memory 106.

Non-transitory memory 106 may include one or more systems for performing various image processing tasks. In one example, non-transitory memory 106 includes an automated measurement system 108. In some embodiments, at least a portion of automated measurement system 102 may be disposed at a device (e.g., edge device, server, etc.) communicably coupled to the medical imaging system and/or medical image processing system 102 via wired and/or wireless connections. In some embodiments, at least a portion of automated measurement system 102 is disposed at a separate device (e.g., a workstation) which can receive images from the medical imaging system and/or medical image processing system 102 or from a storage device which stores images/data generated by the medical imaging system (e.g., a database). Automated measurement system 102 may be operably/communicatively coupled to the user input device 116 and the display device 114. For example, the user 150 may view the medical image 112 on the display device 114, and may use the user input device 116 to initiate an automated measurement task on the medical image 112. In one example, the automated measurement task may prompt the user to select a type of measurement to perform, and/or specify a starting point of the measurement (e.g., a location on the medical image 112 from which to start the selected measurement).

The automated measurement system 108 may include a neural network model 110, which may be trained to predict one or more measurement criteria during performing a measurement to partially or totally automate a measurement process. By partially or totally automating the measurement process (e.g., and not requesting input from the user 150), an error rate of the measurement process may be decreased and/or an efficiency and/or speed of the measurement process may be increased. The neural network model 110 may include trained and/or untrained neural networks and may further include various data or metadata pertaining to the one or more neural networks stored therein. In one example, the neural network model 110 comprises a convolutional neural network (CNN), which may be trained to predict one or more measurement points for performing a measurement based on one or more user-selected measurement points, in accordance with instructions stored in the non-transitory memory 106, as described in greater detail below.

The automated measurement system 108 may include a heat map generator 112, which may generate a heat map representing the user-selected starting point of the automated measurement for inputting into the neural network model 110. The automated measurement system 108 may also include an image pre-processor 114, which may perform one or more pre-processing tasks on the heat map and/or the ultrasound image prior to being inputted into the neural network model 110. For example, the heat map and the ultrasound image may be scaled up or down, cropped, skewed, compressed, etc., to increase an efficiency and/or accuracy of the neural network model 110. The image pre-processor 114 and the heat map generator 112 are explained in greater detail below in relation to FIG. 2.

It should be understood that medical image processing system 102 shown in FIG. 1 is for illustration, not for limitation. Another medical image processing system may include more, fewer, or different components. Further, while an ultrasound image is described herein, it is to be appreciated that medical image 112 may comprise other types of medical images, such as x-ray images, CT images, MRI images, and the like.

Figure 2:
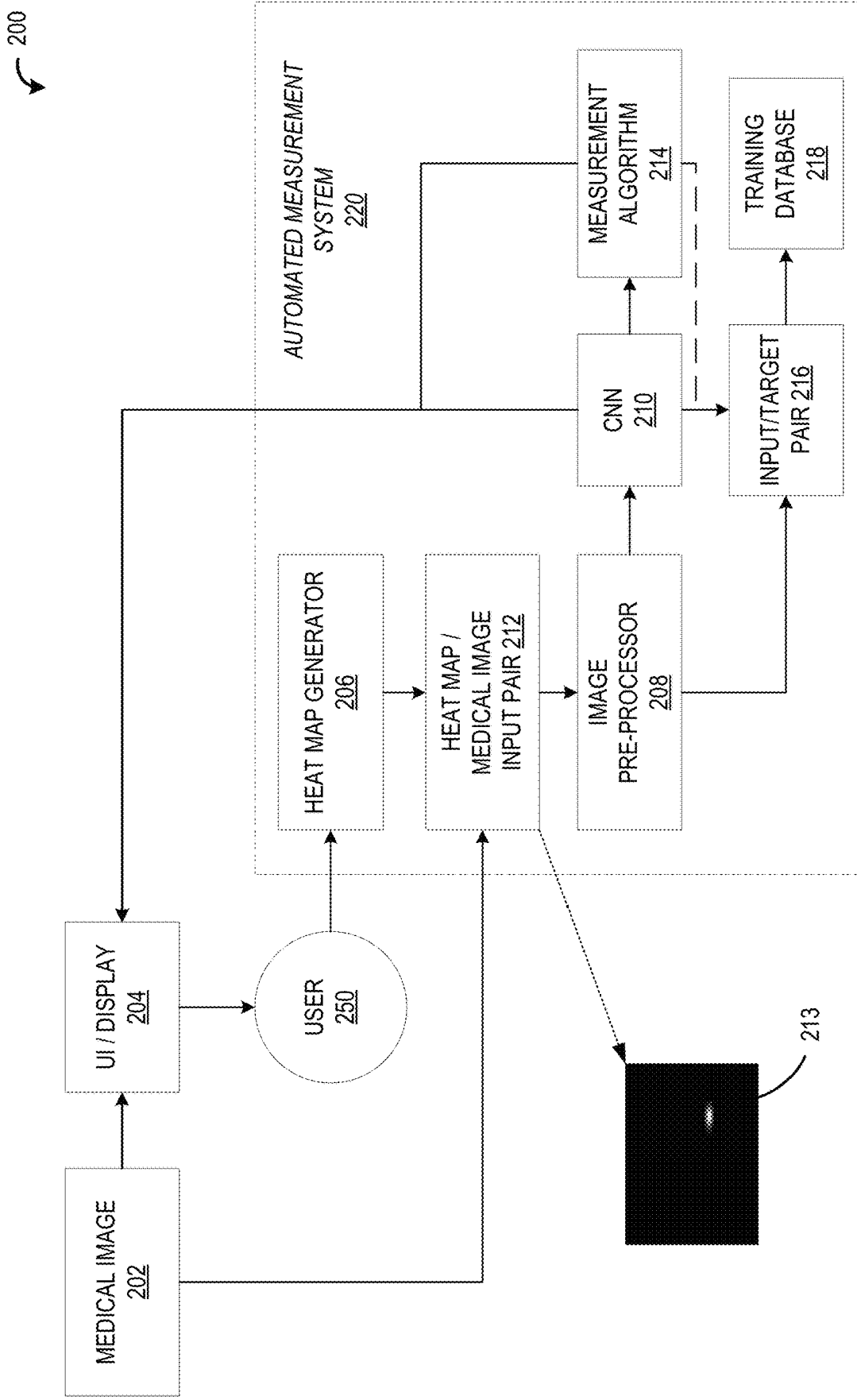
FIG. 2 shows a second block diagram of an exemplary embodiment of a medical image processing system including an automated measurement system.

FIG. 2 shows a block diagram of an exemplary embodiment of a medical image processing system 200 including an automated measurement system, where a flow of data is shown between components of the medical image processing system. The medical image processing system 200 is a non-limiting example of the medical image processing system 102 of FIG. 1.

The medical image processing system 200 may include an automated measurement system 220 (e.g., the automated measurement system 108 of FIG. 1), which may be operated by a user 250 to perform one or more automated measurements of a medical image 202. In one example, the medical image 202 is an ultrasound image generated by an ultrasound probe of an ultrasound system. In other examples, the medical image 202 may be an x-ray, or a CT scan, or a different type of medical image. In some examples, the medical image 202 may be a single frame of a sequence of medical images acquired in real-time. The medical image 202 may include one or more anatomical features, such as a heart, a liver, a spleen, etc., acquired during an examination of a patient, where the user 250 may use the automated measurement system 220 to measure one or more elements of the one or more anatomical features to assist a specialist, for example, in performing a diagnosis of the patient. It should be appreciated that the examples provided herein are for illustrative purposes, and other types of medical images may be included without departing from the scope of this disclosure.

In some examples, the medical image 202 may be processed by the automated measurement system 220 within a medical imaging system, such as the medical imaging system 100 of FIG. 1, while in other examples, the medical image 202 may be processed by the automated measurement system 220 outside of a medical imaging system. For example, the medical image 202 may be acquired by the medical imaging system and stored in a picture archive and communication system (PACS), a radiology information system (RIS), or other suitable storage location. The medical image 202 may be displayed via a user interface (UI)/display device 204 accessed by the user 250. The UI/display device 204 may include a display device such as the display device 114 of FIG. 1 (e.g., a monitor, touchscreen, etc.), and the UI/display device 204 may include a user input device such as the user input device 116 of FIG. 1 (e.g., a mouse, etc.). Via the UI/display device 204, the user 250 may initiate an automated measurement of an anatomical future of the medical image 202.

The automated measurement system 220 may include a convolutional neural network (CNN) 210. In one example, the CNN 210 is trained to predict one or more measurement points of an automated measurement to be performed from one or more user-selected measurement points. In one example, a user-selected starting point of the automated measurement is used to predict an endpoint of the automated measurement. In other examples, a plurality of measurement points of the automated measurement are used to predict one or more additional measurement points. In other words, the user 250 may select a number of measurement points of the automated measurement, and the automated measurement system may "fill in" or "autocomplete" a number of additional measurement points to perform the automated measurement.

Once a full set of measurement points of the automated measurement is obtained, where the full set of measurement points includes the one or more user-selected measurement points and the one or more predicted measurement points, a measurement algorithm 214 may perform the automated measurement based on the full set of measurement points. In one example, the measurement algorithm 214 determines a path from the user-selected starting point to the predicted endpoint, and calculates a distance between the user-selected starting point and the predicted endpoint. In other examples, the automated measurement is a measurement set, and the measurement algorithm 214 calculates a distance between a starting point and an endpoint of each component measurement of the measurement set, and sums the distances to obtain a total measurement of the measurement set. The total measurement may be displayed to the user on the UI/display device 204, and/or distances between connected starting points and endpoints may be displayed to the user on the UI/display device 204, so that the user 250 may see a visual display of where the automated measurement was performed and/or the full set of measurement points used to perform the automated measurement. The total measurement and/or the distances between the connected starting points and endpoints may be recorded in one or more files of the user, and/or used in a subsequent process of the automated measurement system and/or medical imaging system. As described in greater detail below in reference to FIG. 5, the user 250 may interact with the UI/display device 204 to adjust one or more measurement points of the full set of measurement points and repeat the automated measurement if the user 250 is unsatisfied with the result of the automated measurement.

When the user 250 initiates the automated measurement, the one or more user-selected measurement points may be inputted into a heat map generator 206 of the automated measurement system 220. In one example, the heat map generator 206 outputs one or more heat maps 213, where each heat map 213 encodes a user-selected measurement point of the one or more user-selected measurement points via a 2D normal Gaussian probability density function. In other examples, the heat map generator 206 outputs a single heat map 213, where the heat map 213 includes an encoding of each user-selected measurement point of the one or more user-selected measurement points via the 2D normal Gaussian probability density function. As described in further detail below in relation to FIG. 5, the heat map 213 may be used to input the one or more user-selected measurement points into the CNN 210.

The heat map(s) 213 produced by the heat map generator 206 may be paired with the medical image 202 to create a heat map/medical image input pair 212 to be inputted into the CNN 210. For example, if there are two user-selected measurement points on the medical image, the heat map/medical image input pair 212 may include two heat maps (e.g., one for each user-selected measurement point) and the medical image, or the heat map/medical image input pair 212 may include a single heat map with an encoding of both user-selected measurement points and the medical image. Prior to being inputted into the CNN 210, the heat map/medical image input pair 212 may be inputted into an image pre-processor 208, which may pre-process the heat map/medical image input pair 212 via one or more pre-processing routines. In one example, pre-processing the heat map/medical image input pair 212 includes pre-processing both images of the heat map/medical image input pair 212 in accordance with a pre-processing routine of the one or more pre-processing routines. For example, if the pre-processing routine includes cropping the image, scaling the image, and/or skewing the image, both the medical image 202 and the heat map 213 are crops, scaled, and/or skewed in accordance with the preprocessing routine. As described in greater detail below in reference to FIG. 6, the pre-processing of the heat map/medical image input pair 212 may increase an efficiency of the CNN 210.

Once the heat map/medical image input pair 212 has been pre-processed by the image pre-processor 208, the heat map/medical image input pair 212 may be inputted into the CNN 210, where the CNN 210 may predict one or more remaining measurement points of the full set of measurement points used by the measurement algorithm 214 to perform the automated measurement. Additionally, the predicted one or more remaining measurement points used by the measurement algorithm 214 may be further paired with the heat map/medical image input pair 212 to create an input/target pair 216, which may be stored in a training database 218 for future training of the CNN 210. In other words, the input/target pair 216 may include an input element comprising the heat map/medical image input pair 212, and an output element comprising the predicted one or more remaining measurement points. In some examples, the result of the automated measurement may also be included or associated with the input/target pair 216. For example, the result of the automated measurement may be a factor used to adjust a weighting of the CNN 210 based on a back propagation algorithm of the CNN 210.

The one or more remaining measurement points predicted by the CNN 210 may also be outputted to the UI/display device 204, whereby the user 250 may view the full set of measurement points used to perform the automated measurement and/or adjust one or more measurement points of the full set of measurement points to perform a new automated measurement, as described above.

Referring now to FIG. 3A, an ultrasound image 300 of a heart of a patient is shown, including a septum 302, a left ventricle 304, and a posterior wall 306 of the heart. A first set of measurement points is shown for an automated measurement system (e.g., the automated measurement system 220 of FIG. 2) to perform an automated measurement of the septum 302, left ventricle 304, and posterior wall 306 of the heart, including a measurement point 308, a measurement point 310, a measurement point 312, and a measurement point 314. Measurement point 308 indicates an outer boundary of the septum 302, and measurement point 310 indicates an inner boundary of the septum 302, where a thickness of the septum 302 may be equal to a length of a line 309 between measurement point 308 and measurement point 310. Measurement point 314 indicates an outer boundary of the posterior wall 306 of the heart, and measurement point 312 indicates an inner boundary of the posterior wall 306, where a thickness of the posterior wall 306 may be equal to a length of a line 311 between measurement point 312 and measurement point 314. A length of a line 313 between measurement point 312 and measurement point 310 may indicate an extent of the left ventricle 304 (e.g., a width of the left ventricle 304, or a distance between the septum 302 and the posterior wall 306).

In one example, the first set of measurement points comprising measurement point 308, measurement point 310, measurement point 312, and measurement point 314 comprise a full set of measurement points for a single automated measurement. For example, a user of the automated measurement system may select a measurement type indicating that a series of related measurements of a cross-section of the left ventricle 304 are desired (e.g., a left ventricle measurement set), including measurements of the septum 302, the posterior wall 306, and a distance between the septum 302 and the posterior wall 306. For the measurement set corresponding to the cross-section of the left ventricle 304, the measurement point 308 may be considered a first starting point of a first component measurement of the left ventricle measurement set, and measurement point 310 may be considered a first endpoint of the first component measurement of the left ventricle measurement set. The measurement point 310 may be considered a second starting point of a second component measurement of the left ventricle measurement set, and measurement point 312 may be considered a second endpoint of the second component measurement of the left ventricle measurement set. The measurement point 312 may be considered a third starting point of a third component measurement of the left ventricle measurement set, and measurement point 314 may be considered a third endpoint of the third component measurement of the left ventricle measurement set.

In one example, the first set of measurement points is suggested to the user by the automated measurement system, whereby upon initiation of the automated measurement and selection of the type of measurement, the automated measurement system generates the first set of measurement points automatically (e.g., via a procedure such as the procedure described below in FIG. 6). Following a display of the first set of measurement points on a display device of the automated measurement system (e.g., the UI/display device 204 of FIG. 2), the user may be prompted to accept the suggested first set of measurement points (e.g., a default selection). In one example, if the user accepts the suggested first set of measurement points, the automated measurement system performs the automated measurement. If the user does not accept the suggested first set of measurement points, the user may adjust a position of one or more of the measurement point 308, measurement point 310, measurement point 312, and measurement point 314, and command the automated measurement system to perform the automated measurement based on the adjusted first set of measurement points. In some examples, the adjustment of a measurement point (e.g., measurement point 308) may result in one or more of the suggested measurement points (e.g., measurement point 314) being adjusted automatically.

In another example, the first set of measurement points of FIG. 3A may include one or more user-selected measurement points and one or more measurement points that are predicted by the automated measurement system. For example, the measurement point 308 may be selected by the user, while measurement point 310, measurement point 312, and measurement point 314 may be predicted by the automated measurement system, or the measurement point 308 and the measurement point 310 may be selected by the user, while measurement point 312 and measurement point 314 may be predicted by the automated measurement system, or the measurement point 308 and the measurement point 314 may be selected by the user, while measurement point 310 and measurement point 312 may be predicted by the automated measurement system. Further, in some examples, one or more intermediate measurement points may be predicted between a measurement point that is a starting point of an automated measurement and an endpoint of the automated measurement. For example, during a segmentation task, a plurality of intermediate measurement points may be predicted to define a boundary of a region of a region of interest, as described in greater detail below in FIGS. 4A and 4B.

Figure 3B:
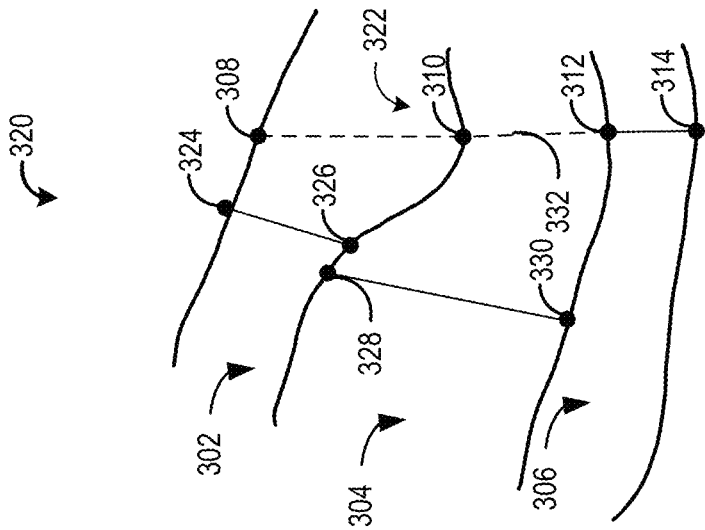
FIG. 3B shows a second set of measurement points for measuring a medical image.
Figure 3A:
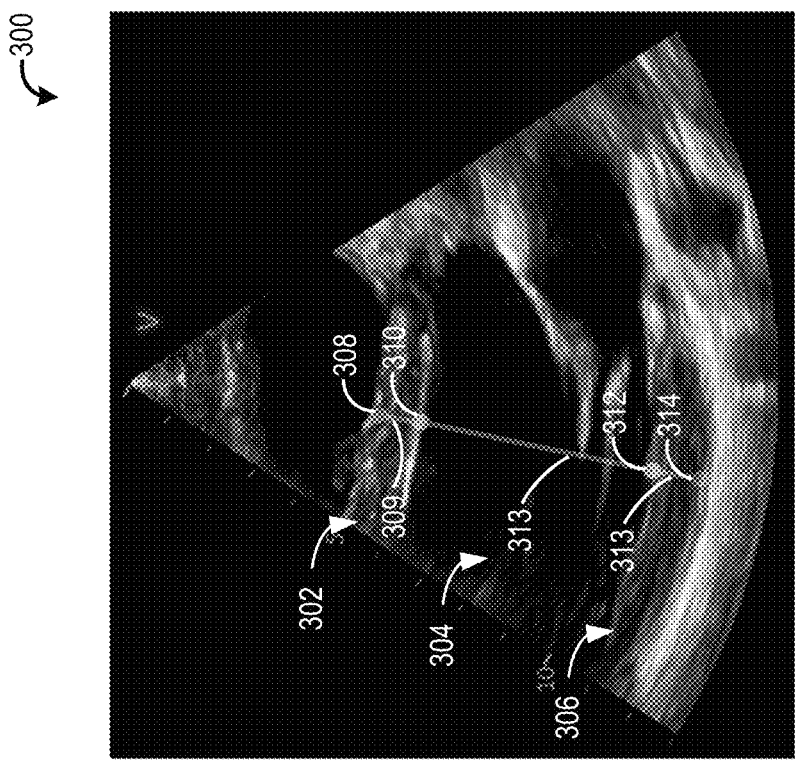
FIG. 3A shows a first set of measurement points for measuring a medical image.
Figure 3D:
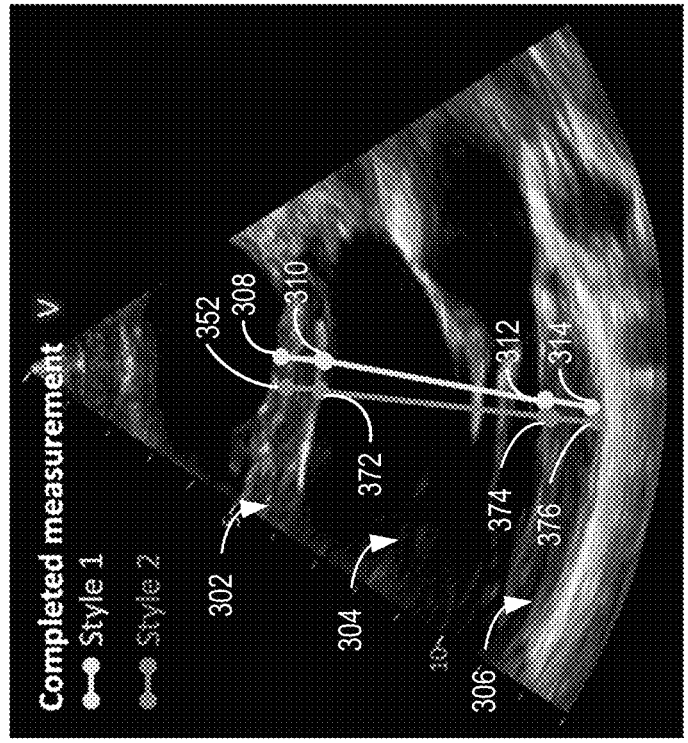
FIG. 3D shows alternative measurement points for measuring a medical image in a first style and a second style.
Figure 4B:
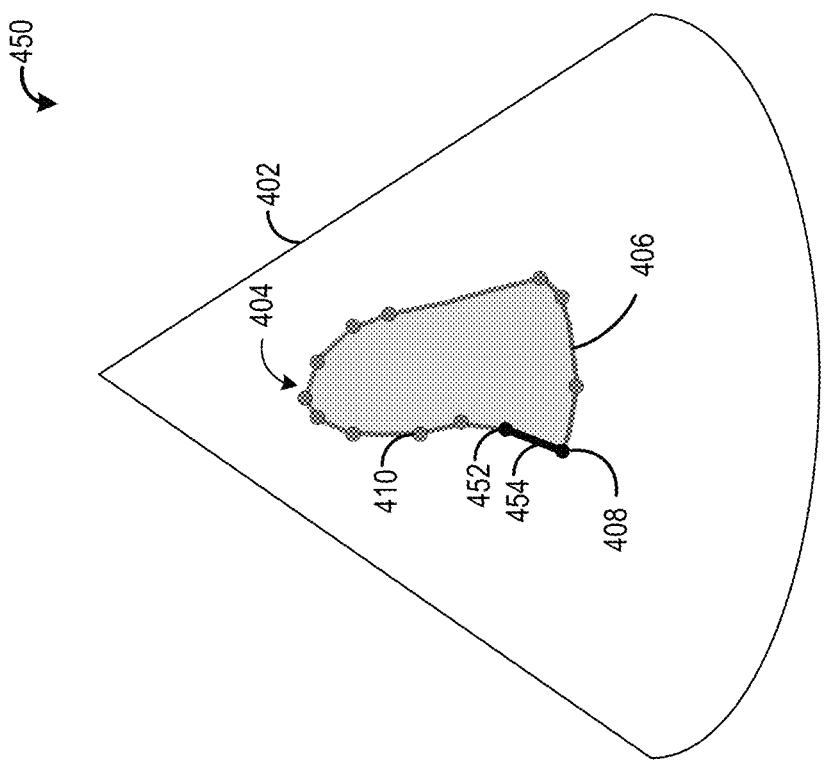
FIG. 4B shows a first segment of a segmentation algorithm.
Figure 4A:
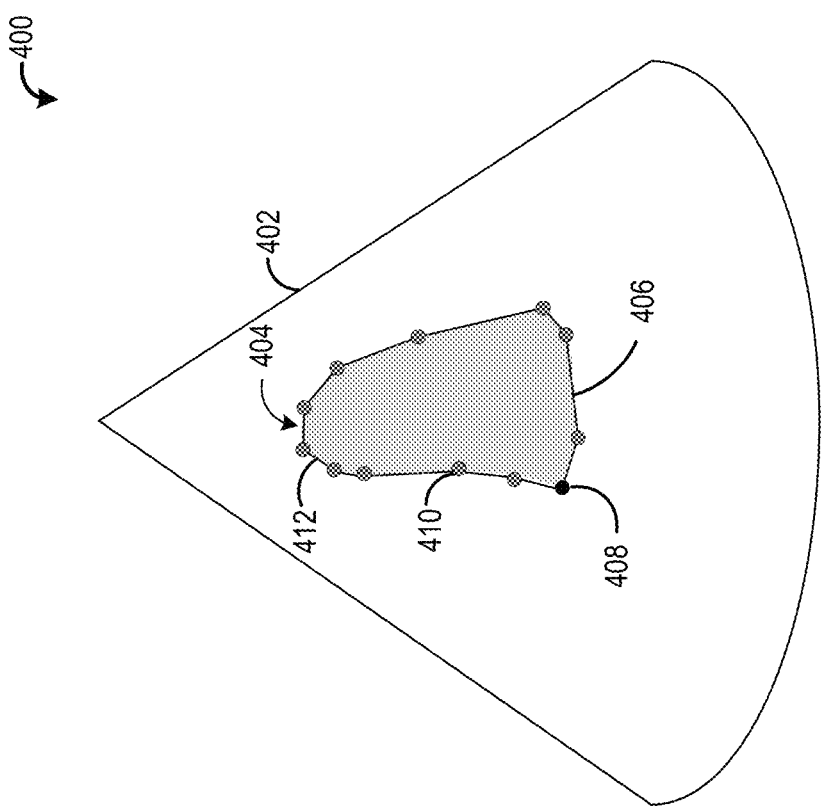
FIG. 4A shows a starting point of a segmentation algorithm.

FIG. 3B shows a line drawing 320 of an ultrasound image of a heart, including the septum 302, the left ventricle 304, and the posterior wall 306 of the ultrasound image 300 of FIG. 3A, where the septum 302 has a bulge 322. The bulge 322 is located on the septum 302 at the measurement point 310 of the first set of measurement points of FIG. 3A. A dashed line 332 connects the first set of measurement points (e.g., from FIG. 3A), which may be suggested by the automated measurement system. For example, the first set of measurement points may be suggested by a neural network model of the automated measurement system based on training data, where the training data included ultrasound images of hearts without bulging septums and no ultrasound images of hearts with bulging septums. As a result of the neural network model not being trained on images of a bulging septum, the first set of measurement points suggested by the automated measurement system may be poorly positioned, where a result of the automated measurement may not be satisfactory to the user (e.g., the result may not provide an accurate measurement of the left ventricle 306, because the automated measurement is performed at a location of the bulge 322).

As a result of the user visually inspecting the ultrasound image and detecting the bulge 322 of the septum 302, the user may select a measurement point 324 as a starting point of the automated measurement rather than the measurement point 308. Upon selecting the measurement point 324 as the starting point of the automated measurement, the automated measurement system may predict a measurement point 326 on the inner boundary of the septum 302 as an alternative measurement point to the measurement point 310 for measuring the thickness of the septum, and may predict the measurement point 328 as an alternative measurement point on the inner boundary of the septum 302 and the measurement point 330 as an alternative measurement point on the inner boundary of the posterior wall 306 for measuring the extent of the left ventricle 304. The automated measurement system may predict the measurement point 312 and the measurement point 314 for measuring the thickness of the posterior wall 306, since the bulge 322 does not affect the thickness of the posterior wall 306.

As another example, the user may select the measurement point 324 as a first starting point of a measurement set of the automated measurement, and may additionally select the measurement point 328 as a second starting point of the automated measurement. For example, the user may wish to indicate to the automated measurement system a preference for measuring the extent of the left ventricle 304 starting from the measuring point 328 and not from the measuring point 326. In response to the user selecting the measurement point 324 as the first starting point of the measurement set and the measurement point 328 as the second starting point of the measurement set, the automated measurement system may predict the measurement point 326 (e.g., a first endpoint), the measurement point 330 (e.g., a second endpoint), the measurement point 312 as a third starting point, and the measurement point 314 as a third endpoint, based on the user-selected measurement point 324 and the user-selected measurement point 328.

Figure 3C:
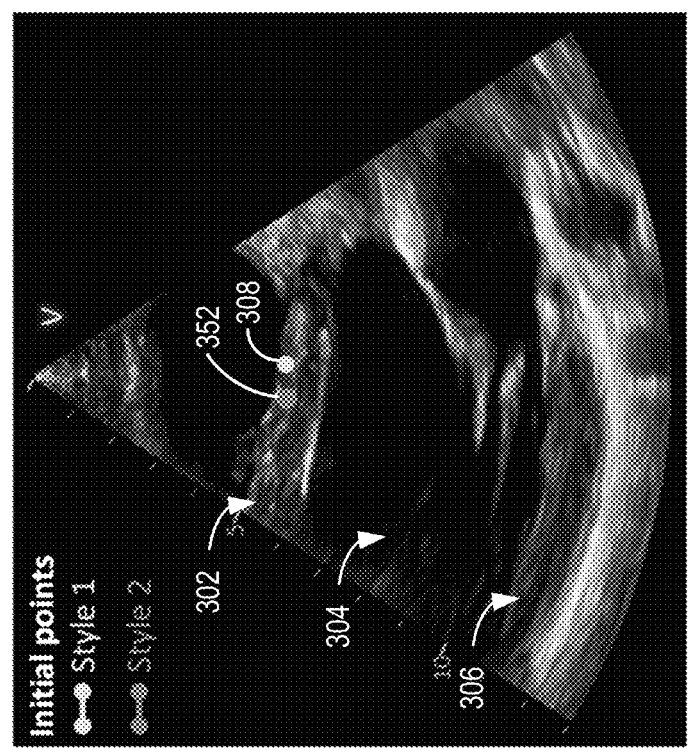
FIG. 3C shows alternative starting points for measuring a medical image.

Turning to FIG. 3C, an ultrasound image 350 (e.g., the ultrasound image 300 of FIG. 3A) is shown, including the septum 302, the left ventricle 304, and the posterior wall 306 of the heart. Ultrasound image 350 shows two alternative starting points of an automated measurement performed by an automated measurement system. In one example, the automated measurement is the same as the automated measurement described above in reference to FIG. 3A (e.g., a measurement of a cross-section of the left ventricle 304). In one example, the measurement point 308 is an automatically generated starting point of the measurement (e.g., predicted by the automated measurement system).

An alternative starting point 352 is shown on the ultrasound image 350, where the alternative starting point 352 is selected by a user. For example, the measurement point 308 automatically selected by the automated measurement system may be a starting point based on a first measurement style, which is learned by the automated measurement system due to a machine learning model (e.g., a CNN) of the automated measurement system being trained on a plurality of measurements made in the first measurement style. The user-selected alternative starting point 352 may be based on a second measurement style, where the second measurement style is different from the first measurement style and reflects a training and/or a preference of the user. In other examples, the measurement point 308 is a user-selected starting point selected by a first user, and the alternative starting point 352 is selected by a second user, where the first user performs measurements in the first measurement style and the second user performs measurements in the second measurement style.

In FIG. 3D, an ultrasound image 370 shows alternative additional measurement points generated by the automated measurement system using the two alternative starting points of FIG. 3C. The first set of measurement points of FIG. 3A is depicted in ultrasound image 370, including the measurement point 308, the measurement point 310, the measurement point 312, and the measurement point 314. Additionally, a second set of measurement points of is shown, including the alternative starting point 352 of FIG. 3C, and a measurement point 372, a measurement point 374, and a measurement point 376. The alternative starting point 352 is on the outer boundary of the septum 302 and measurement point 372 is on the inner boundary of the septum 302, and measurement point 376 is on the outer boundary of the posterior wall 306 and measurement point 374 is on the inner boundary of the posterior wall 306. Thus, the thickness of the septum 302 may be measured as a distance between measurement point 352 and measurement point 372 of the second set of measurement points, or as a distance between measurement point 308 and measurement point 310 of the first set of measurement points. Similarly, the thickness of the posterior wall 306 may be measured as a distance between measurement point 376 and measurement point 374 of the second set of measurement points, or as a distance between measurement point 314 and measurement point 312 of the first set of measurement points. An extent of the left ventricle 304 may be measured as distance between measurement point 372 and measurement point 374 of the second set of measurement points, or measurement point 312 and measurement point 310 of the first set of measurement points.

Thus, measurement points 310, 312, and 314 of the first set of measurement points are predicted by automated measurement system based on the measurement point 308, and measurement points 372, 374, and 376 of the second set of measurement points are predicted by automated measurement system based on the alternative starting point 352. By selecting distinct starting points for measuring the cross section of the left ventricle 304, including the septum 302 and the posterior wall 306, the first user may obtain a result of the first automated measurement, and the second user may obtain a result of the second automated measurement. In other examples, a single user may select a preferential measurement of the two alternative measurements, based on a preference for the first style or the second style.

Referring now to FIG. 4A, an ultrasound display 400 is shown of an ultrasound image 402, where an automated segmentation task is being performed on a region of interest (ROI) 404 of the ultrasound image 402. In one example, the automated segmentation task is performed by or partly by an automated measurement system, such as the automated measurement system 108 of FIG. 1 and/or the automated measurement system 220 of FIG. 2. The ultrasound display 400 may be displayed to a user of the automated measurement system (e.g., the user 250 of FIG. 2) on a display device, such as the UI/display device 204 of FIG. 2.

Performing the automated segmentation task may include estimating a boundary 406 of the ROI 404, where all of the ROI 404 lies within the boundary 406 and none of the ROI 404 lies outside the boundary 406. For example, segmentation may be used to identify an anatomical feature of interest (e.g., for subsequent measurement), distinguish a volume of abnormal tissue from a volume of normal tissue in a patient during an ultrasound examination, or other suitable task. In one example, estimating the boundary 406 includes selecting a plurality of segmentation measurement points 410 around a perimeter of the ROI 404 (depicted in FIG. 4A as gray dots), and connecting the segmentation measurement points 410 to form a plurality of segments 412 that collectively approximate a shape of the ROI 404. The boundary 406 may be displayed to a user of the automated measurement system, where the segments 412 that approximate the shape of the ROI 404 may be superimposed upon the ultrasound image 402, thereby allowing the user to more clearly visualize the shape of the ROI 404. The segments 412 of the boundary 406 may be used in subsequent processing routines, for example, to measure an area of the ROI 404, to compare the shape of the ROI 404 with one or more shapes of the anatomical feature in other ultrasound images, and so forth.

In some examples, the segmentation task is performed automatically by the automated measurement system, where the automated measurement system automatically selects the segmentation measurement points 410 and generates the segments without input from the user. The segmentation measurement points 410 may be selected by a machine learning segmentation model trained using one or more segmentation techniques (e.g., Automated Ejection Fraction (AutoEF), AFI ROI, etc.). However, to perform the segmentation task, one or more parameters of the segmentation task may be estimated by the automated measurement system. In one example, the automated measurement system may estimate a depth of placement into tissue of the ROI 404 at which the segmentation measurement points 410 and the corresponding segmentation are placed. For example, the segmentation measurement points 410 may be placed at a first depth (e.g., on an estimated surface of the ROI 404), or the segmentation measurement points 410 may be placed at a second, deeper depth (e.g., into the tissue below the estimated surface of the ROI 404).

In one example, the segmentation task is performed semi-automatically, where the user selects one or more of the segmentation measurement points 410 to perform the segmentation task, and the segmentation model predicts one or more remaining segmentation measurement points 410 for performing the segmentation. For example, the user may select a starting point 408 of the segmentation task, and the automated measurement system may predict all of the one or more remaining segmentation measurement points 410 for performing the segmentation. By selecting the starting point 408, the user may provide a desired depth of tissue to place the segmentation measurement points 410 to the automated measurement system. As a result of receiving the starting point 408 of the segmentation task, the automated measurement system may set the depth of tissue parameter based on user input rather than estimating the depth of tissue parameter, which may result in a more accurate segmentation and/or a segmentation that is more desirable to the user.

FIG. 4B shows an ultrasound display 450 of the ultrasound image 402, where the automated segmentation task of FIG. 4A is being performed on the ROI 404 of the ultrasound image 402. In the ultrasound display 450, the user has selected the starting point 408 for the segmentation task, and additionally selected a second boundary point 452 of the segmentation measurement points 410. A first segment 454 is placed on the boundary 406 by the automated measurement system, comprising a line connecting the starting point 408 and the second boundary point 452. The one or more remaining segmentation measurement points 410 for performing the segmentation task may be predicted by the segmentation model of the automated segmentation system based on the starting point 408 and the second boundary point 452. By selecting the second boundary point 452, the user indicates a preference for segmenting the ROI 404 with a left side of the boundary 406 that extends slightly deeper into the ROI 404 than the left side of the boundary 406 of FIG. 4A, where the boundary points of the left side of the boundary 406 are predicted based on the starting point and not the second boundary point 452.

In FIG. 4B, the starting point 408 and the second boundary point 452 are consecutive points along the boundary 406. In other examples, the second boundary point 452 may not be a consecutive boundary point to the starting point 408, and the second boundary point 452 may be a different boundary point 410, or a plurality of boundary points of the segmentation measurement points 410 may be selected by the user. For example, the ROI 404 may include a portion of the boundary 406 that is clearly visible in the ultrasound image 402, and a portion of the boundary 406 that is not clearly visible. In addition to the starting point 408, the user may select one or more segmentation measurement points 410 along the portion of the boundary 406 that is clearly visible, and allow the automated measurement system to predict one or more segmentation measurement points 410 along the portion of the boundary 406 that is not clearly visible.

Figure 5:
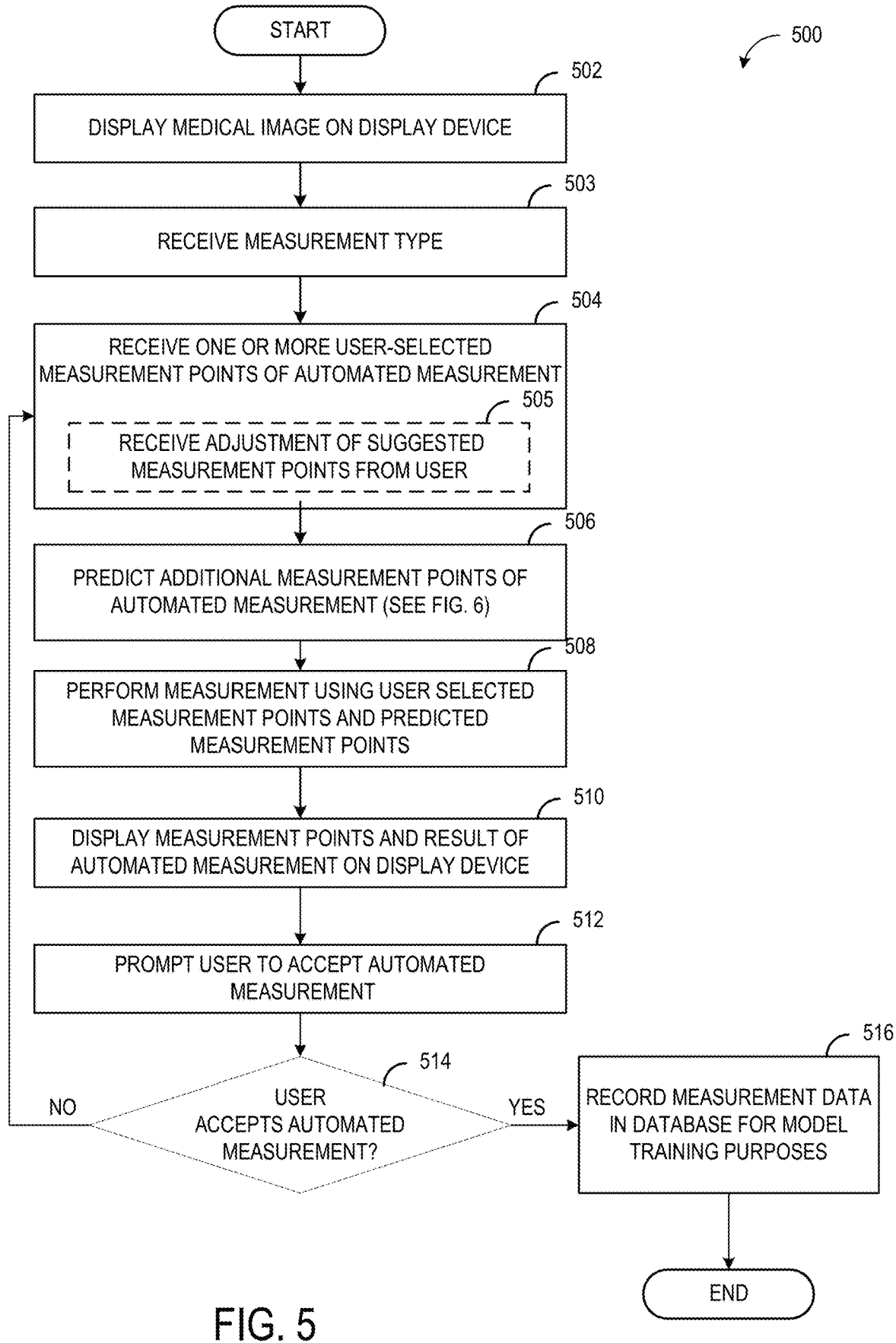
FIG. 5 shows a flowchart illustrating an example high-level method for performing an automated measurement of a medical image.

Referring to FIG. 5, a flow chart of a method 500 is shown for performing an automated measurement of an anatomical feature of a medical image. Method 500 may be implemented by an automated measurement system, such as the automated measurement system 108 of FIG. 1 and/or the automated measurement system 220 of FIG. 2, which may further comprise part of a medical image processing system such as the medical image processing system 102 of FIG. 1. In an embodiment, operations of method 500 may be stored in non-transitory memory and executed by a processor, such as non-transitory memory 106 and processor 104 of medical image processing system 102 of FIG. 1, respectively.

At 502, method 500 includes displaying a medical image on a display device of the automated measurement system (e.g., the display device 114 of medical image processing system 102 of FIG. 1). In one example, the medical image may be an ultrasound image. The ultrasound image may be a 2D ultrasound image or a 3D volume. In some examples, the ultrasound image may be a single frame of a sequence of medical images acquired from a patient in real time, for example, during an ultrasound examination by a clinician. In other examples, the medical image may be an x-ray image, a CT image, an MRI image, a visible light image, or another type of medical image that includes an anatomical feature of interest.

At 503, method 500 includes receiving a measurement type of the automated measurement to be performed. In one example, the measurement type is received from the user. In other examples, the automated measurement system may be following a scanning/measurement protocol and the protocol may dictate the measurement that is to be performed. The measurement type may include a linear measurement, where a distance along a straight line between two points on the ultrasound image is measured, an area measurement, where a two dimensional area of the ultrasound image is measured, a volume measurement of a 3D image/volume, a Doppler measurement of a blood flow, and/or another suitable measurement. For example, in a spectral Doppler measurement, one or more velocities and/or directions of a blood flow captured by a Doppler ultrasound device are displayed graphically as 2D curves. In some examples, the measurement type includes an anatomical feature in the medical image to measure. For example, for an echocardiologist performing an ultrasound examination on a heart of a patient, specifying the measurement type may include specifying that a measurement of a thickness of a septum of the patient is desired, or specifying that a measurement of a distance between the septum of the patient and a left ventricle wall is desired, or specifying that a measurement of a cross section of a left ventricle including the septum and the left ventricle wall is desired. In some examples, specifying the measurement type may include prompting the user to select a measurement type from a list of candidate measurement types via the display device, where the candidate measurement types are based on a type of ultrasound image, or a specialty of a medical service within which the automated measurement is being performed, or another similar criterion.

At 504, method 500 includes receiving one or more user-selected measurement points of the automated measurement from the user via a user input device, such as the UI/display device 204 of FIG. 2. In one example, a starting point of the automated measurement is received from the user via the user input device. For example, the user may select the starting point by clicking on a location within the medical image with a user input device (e.g., a mouse or touchscreen), thereby transmitting Cartesian coordinates of the location within the ultrasound image to the automated measurement system. In other examples, the one or more user-selected measurement points include the starting point and one or more additional measurement points (e.g., one or more additional starting points and/or endpoints of a measurement set) of the automated measurement.

Alternatively, at 505, receiving the one or more user-selected measurement points of the automated measurement may include displaying one or more suggested measurement points of the automated measurement (e.g., a suggested starting point, a suggested endpoint, and/or one or more suggested starting points and endpoints of the measurement set), and receiving an adjustment of one or more of the suggested measurement points from the user. The suggested measurement points may be selectable elements superimposed on the medical image, where the user may select and reposition the suggested measurement points via the user input device. Additionally, the suggested measurement points may be connected by one or more lines to indicate one or more segments of the automated measurement. For example, the user may select a suggested measurement point via a user input, and adjust a position of the suggested measurement point by sliding the measurement point until the suggested measurement point reaches a desired new location. When the suggested measurement point is repositioned by the user, one or more lines connecting the suggested measurement point to other suggested measurement points (e.g., the one or more segments) may be updated to the desired new location.

Thus, the user may select the starting point without guidance from the automated measurement system, or the user may select the starting point with guidance from the automated measurement system, for example, the automated measurement system may display one or more candidate starting points for the user to select from. The candidate starting points may be generated based on the measurement type. For example, if the user specifies a measurement of the thickness of the septum of the patient in the example above, the automated measurement system may display the one or more candidate starting points on the medical image, based on historical data collected by the automated measurement system (e.g., from previous measurements, from manually curated starting points, etc.). In accordance with one or more algorithms of the automated measurement system, a single candidate starting point may be selected as a default starting point (e.g., if the default starting point is indicated by established guidelines and/or the historical data). Additionally, the user may perform the automated measurement, and based on a result of the automated measurement, the user may repeat the automated measurement. If the user repeats the automated measurement, the starting point of a previous automated measurement may be displayed as a candidate starting point, where the user may adjust a position of the candidate starting point to specify a new starting point for a new automated measurement.

In other examples, the endpoint of the previous automated measurement may also be displayed, or the one or more starting points and endpoints of the measurement set of the previous automated measurement may be displayed. For example, as described above in reference to FIG. 3A, the automated measurement may include measuring one or more distances between the one or more starting points and endpoints of the automated measurement, and summing the distances. If the one or more starting points and endpoints are displayed to the user, receiving the starting point of the automated measurement may also include receiving an adjustment to one or more of the one or more starting points and endpoints.

At 506, method 500 includes predicting additional measurement points of the automated measurement from the user-selected measurement points. For example, the user may select the starting point, and the automated measurement system may predict the endpoint from the starting point. As another example, the user may select one or more measurement points of a measurement set, and the automated measurement system may predict one or more additional measurement points of the measurement set from the user-selected measurement points. Predicting the additional measurement points of the automated measurement from the user-selected measurement points is described in greater detail below in reference to FIG. 6.

At 508, method 500 includes performing the automated measurement using the user-selected measurement points and the predicted additional measurement points. In one example, performing the automated measurement includes measuring a distance between the starting point and the endpoint, or between one or more starting points and endpoints of a measurement set. For example, the user may select the starting point of the automated measurement. From the starting point of the automated measurement, the automated measurement system may predict a first endpoint, a second starting point, a second endpoint, a third starting point, and a third endpoint of the measurement set (e.g., as described above in reference to FIG. 3A). A segmented measurement path may be created that starts at starting point and proceeds through each of the first endpoint, the second starting point and endpoint, and the third starting point and endpoint of the measurement set, forming three segments. A first length of a first segment may be calculated, as a distance between the starting point and the first intermediate endpoint. A second length of a second segment may be calculated, as a distance between the second starting point and the second endpoint. A third length of a third segment may be calculated, as a distance between the third starting point and the third endpoint. The first length of the first segment, the second length of the second segment, and the third length of the third segment may be summed to produce a total measurement of the anatomical feature along the path. It should be appreciated that the terms "starting point" and "endpoint" refer to a specific measurement, and that a measurement point may be both a starting point of one measurement and an endpoint of a different measurement.

At 510, method 500 includes displaying a full set of measurement points comprising the user-selected measurement points and the predicted additional measurement points and a result of the automated measurement on the display device for the user to accept. The full set of measurement points may be connected by one or more lines indicating one or more segments of the automated measurement, as described above. The result of the automated measurement may be displayed as an annotation on the ultrasound image, and/or may be displayed in a different element of a user interface of the automated measurement system (e.g., the UI 204 of FIG. 2). In some examples, individual measurements of the one or more segments of the automated measurement may be displayed on the display device.

At 512, method 500 includes prompting the user to accept the automated measurement. In one example, the automated measurement system displays a pop-up element where the user may select a control (e.g., an accept button) to indicate that the user accepts the automated measurement, or select a different control (e.g., a cancel button) to indicate that the user does not accept the automated measurement. At 514, method 500 includes determining whether the user accepts the automated measurement. If at 514 it is determined that the user does not accept the automated measurement, method 500 proceeds back to 505, where method 500 includes displaying the full set of measurement points and receiving one or more adjustments of the full set of measurement points as described above.

If at 514 it is determined that the user accepts the automated measurement, method 500 proceeds to 516. At 516, method 500 includes recording measurement data of the automated measurement in a database. In one example, the measurement data includes the user-selected measurement points and the predicted additional measurement points, and the result of the automated measurement, where the measurement data is stored in a database for the purposes of refining a neural network model used to predict the predicted additional measurement points of the automated measurement from the user-selected measurement points of the automated measurement, as described in relation to FIG. 6. Further, the automated measurement may be saved in memory with the medical image, e.g., as part of a patient's electronic medical record and/or as part of a study/exam of a patient. Method 500 then ends.

Figure 6:
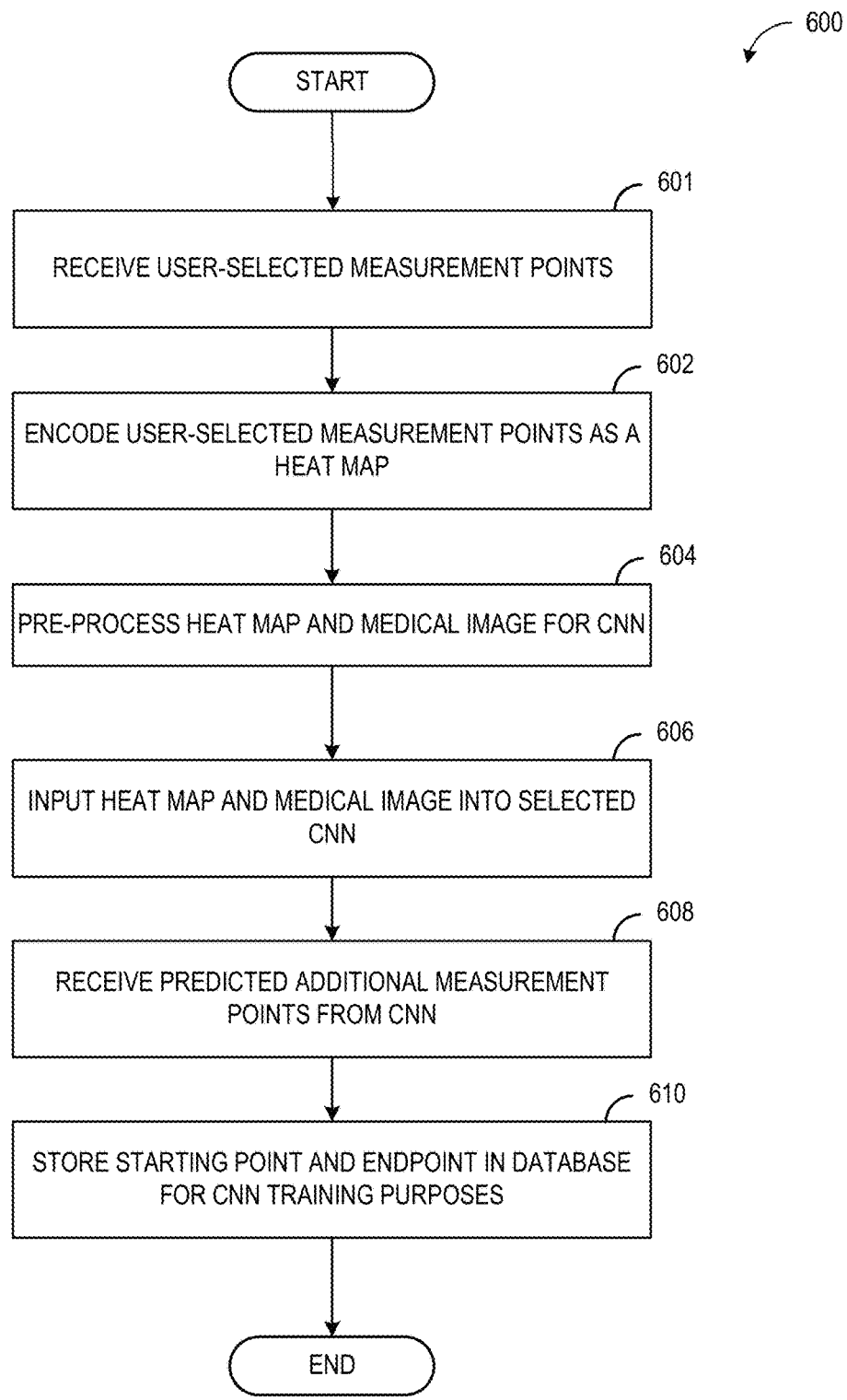
FIG. 6 shows a flowchart illustrating an example method for generating additional measurement points from an initial measuring point.

Referring now to FIG. 6, a flow chart of an exemplary method 600 is shown for predicting, when measuring an anatomical feature of a medical image, one or more additional measurement points from one or more user-selected measurement points. In one example, one or more convolutional neural networks (CNN) are used to predict the one or more additional measurement points from one or more user-selected measurement points. Method 600 may be carried out by an automated measurement system, such as the automated measurement system 108 of FIG. 1 and/or the automated measurement system 220 of FIG. 2. In one example, method 600 is carried out as part of method 500 described above in relation to FIG. 5.

At 601, method 600 includes receiving the one or more user-selected measurement points (also referred to herein as the user-selected measurement points) from a user of the automated measurement system. In one example, the user-selected measurement points are received by the automated measurement system as a sets of x/y coordinate points, where each set of x/y coordinate points corresponds to a location on the medical image selected by the user with a user input device (e.g., the UI/display device 204 of FIG. 2). However, machine learning algorithms (e.g., of a CNN) have been shown to perform poorly at mapping coordinates in Cartesian coordinate space to pixel space (e.g., the medical image). Therefore, an accuracy and/or an efficiency of the machine learning algorithms may be increased by encoding the sets of x/y coordinate points as one or more heat maps, where the user-selected measurement points inputted into a CNN of the one or more CNNs are represented in pixel space.

At 602, method 600 includes encoding the one or more user-selected measurement points as heat maps. In one example, each set of x/y coordinate points is encoded as a heat map by generating a 2D normal Gaussian probability density function with a standard deviation (e.g., 10 pixels) centered on the set of x/y coordinate points. The heat map may be generated in a first resolution (e.g., 512×256 pixels), where the first resolution matches a resolution of the medical image (e.g., raw data of the medical image). Once the heat map is generated, the heat map may be appended to the medical image, where the heat map and the medical image represent inputs into different channels of a CNN. As described above in reference to FIG. 2, a single heat map may be used to represent a plurality of sets of x/y coordinate points, or a plurality of heat maps may be used to represent the plurality of sets of x/y coordinate points.

For example, the medical image may be an ultrasound image of a portion of a heart of a patient, and the user may select a starting point for performing an automated measurement of the heart by clicking on the medical image with a mouse (e.g., as described above in relation to method 500 of FIG. 5). A set of x/y coordinates of the starting point may be received from the user by the automated measurement system. A first heat map (e.g., the heat map 213 of FIG. 2) with 512×256 resolution may be created, where a parameter (e.g., a brightness, a color, etc.) of each pixel of the first heat map is adjusted as a function of the set of x/y coordinates of the starting point, according to the 2D normal Gaussian probability density function, such that the starting point is represented as a visual Gaussian pattern (also referred to herein as a Gaussian) in pixel space with the starting point at the center of the Gaussian. As a result, a superimposition of the first heat map on the medical image (e.g., with the same size/resolution) indicates a position of the starting point on the medical image that corresponds to the set of x/y coordinates of the starting point.

In other examples, the user may select a plurality of user-selected measurement points for performing an automated measurement of the heart, where each user-selected measurement point of the plurality of user-selected measurement points is received as a set of x/y coordinates. A second heat map (e.g., also with 512×256 resolution) may be created, where a parameter (e.g., a brightness, a color, etc.) of each pixel of the second heat map is adjusted as a function of each user-selected measurement point, according to the 2D normal Gaussian probability density function, such that each user-selected measurement point is represented as a distinct Gaussian in pixel space. As a result, a superimposition of the second heat map on the medical image indicates a position of each user-selected measurement point on the medical image corresponding to the set of x/y coordinates of each user-selected measurement point.

At 604, method 600 includes pre-processing the heat map and the medical image (also referred to herein as the input images) prior to being inputted into a CNN. For example, the input images may be cropped and/or rescaled to a different resolution (e.g., to more closely align an expected spatial distribution of the Gaussian with one or more physical dimensions of the medical image), and/or the input images may be pre-processed in another, similar manner.

At 606, method 600 includes inputting the input images into a selected CNN of the one or more CNNs. In one example, the one or more CNNs are trained CNNs, where each trained CNN of the one or more CNNs is trained on plurality of medical images of a particular anatomical feature of interest and/or a different measurement of an anatomical feature, and the selected CNN is selected based on the anatomical feature of interest of the medical image and/or type of measurement being performed. For example, the one or more CNNs may include a first CNN trained on a plurality of medical images of a first anatomical feature (e.g., a heart), a second CNN trained on a plurality of medical images of a second anatomical feature (e.g., a lung), a third CNN trained on a plurality of medical images of a third anatomical feature (e.g., a liver), and so on. Thus, if the input images include a medical image of a heart, the first CNN may be selected by the automated measurement system; if the input images include a medical image of a lung, the second CNN may be selected by the automated measurement system; and so on. In one example, the selected CNN is selected based on a type of measurement selected by the user, as described above in reference to method 500 of FIG. 5. A training of the one or more CNNs is described in greater detail below in reference to FIG. 7.

At 608, method 600 includes receiving one or more predicted additional measurement points outputted by the selected CNN based on the input images. In one example, the one or more predicted additional measurement points are outputted by the selected CNN in the form of an output heat map, where each predicted additional measurement point of the one or more predicted additional measurement points is visually represented on the output heat map. In one example, each predicted additional measurement point is visually represented as a discrete point (e.g., a dot), while in other examples, each predicted additional measurement point is visually represented by a function of the predicted additional measurement point (e.g., a probability density function), which may be a Gaussian. For example, if three additional measurement points are predicted from a user-selected measuring point encoded in the heat map of the input images, the output heat map may include three Gaussians positioned on the output heat map.

In one example, the output heat map outputted by the selected CNN including the one or more predicted additional measurement points is used by the automated measurement system to display the one or more predicted additional measurement points on the display device, as described above in reference to method 500 of FIG. 5. In other examples, the one or more predicted additional measurement points outputted by the selected CNN in the output heat map are converted to sets of x/y coordinates to display on the display device.

At 610, method 600 includes storing the one or more user-selected measurement points (e.g., input points that were inputted into the selected CNN) and the one or more predicted additional measurement points (e.g., output points that were outputted by the selected CNN) in a database. In one example, the input points and the output points are stored for training purposes of the selected CNN. For example, training sets including the input points and the output points may be periodically used to further train the selected CNN to increase an accuracy of the CNN. Method 600 then ends.

Figure 7:
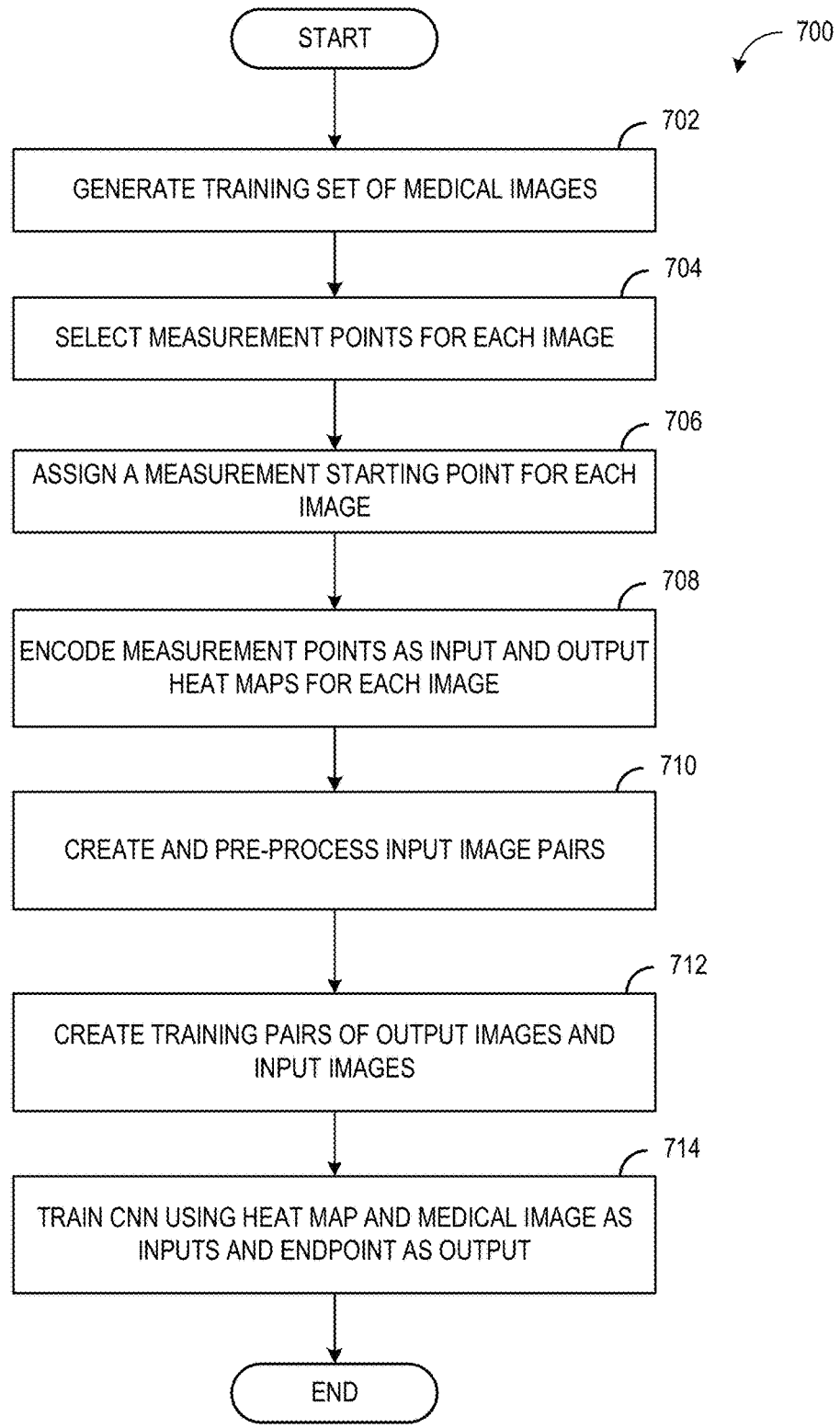
FIG. 7 shows a flowchart illustrating an example method for training a convolutional neural network.

Referring now to FIG. 7, a flow chart of an exemplary method 700 is shown for training a convolutional neural network (CNN) to predict one or more additional measurement points from a user-selected starting point, during performance of an automated measurement of an anatomical feature of a medical image. The automated measurement may be performed by an automated measurement system, such as the automated measurement system 108 of FIG. 1 and/or the automated measurement system 220 of FIG. 2. The CNN may be the same as or similar to CNN 210 of FIG. 2 and/or the CNNs described above in reference to method 600 of FIG. 6.

At 702, method 700 includes generating a training set of medical images. In one example, the medical images are collected from stored medical images in one or more databases, where the stored medical images are acquired during patient examinations. The medical images may be categorized based on an anatomical feature imaged. For example, a first category of medical images may include medical images of a heart, a second category of medical images may include medical images of a lung, and so on. Each category of medical images may be used to create a corresponding training set. For example, a heart training set may be created using images from the first category, a lung training set may be created using images from the second category, and so on.

At 704, method 700 includes, for each medical image of the training set, selecting a plurality of measurement points that may be used to measure an anatomical feature of the medical image. The plurality of measurement points may include a starting point of the measurement and an endpoint of the measurement, as well as one or more additional starting points and endpoints (e.g., of a measurement set). In one example, the plurality of measurement points are manually selected by one or more experts (e.g., expert users of a medical imaging system). In other examples, the plurality of measurement points may be taken from an automated measurement, or the plurality of measurement points may be adjustments of automated measurements made by the one or more experts. For example, a user of the automated measurement system may perform an automated measurement, and select (or adjust and select) one or more measurement points generated by the automated measurement system for the training set.

At 706, method 700 includes, for each medical image of the training set, assigning one of the plurality of measurement points as the starting point of the measurement, where the starting point will be input into the CNN, and the CNN will predict one or more remaining measurement points from the starting point. The starting point may be any of the measurement points as long as the starting point is consistent among each image. In some examples, the starting point may be the top-most point, the bottom-most point, the left-most point, the right-most point, a corner point, a point positioned at a particular anatomical feature or region, or another suitable point. The expert may indicate the starting point, or the starting point may be identified in an automated manner (e.g., via a segmentation algorithm). In some examples, as described above, one or more additional measurement points may also be assigned to be input into the CNN. At 708, method 700 includes, for each medical image of the training set, encoding the starting point(s) as one or more input heat maps (e.g., as described above in reference to method 600 of FIG. 6), and encoding the one or more remaining measurement points of the plurality of measurement points as one or more target heat maps (e.g., to be used as ground truth measurement points during training of the CNN).

At 710, method 700 includes, for each medical image of the training set, creating and pre-processing input image pairs for training the CNN, where each input image pair comprises at least one input heat map and the medical image, and the input image pair is pre-processed as described in method 600 of FIG. 6. At 712, method 700 includes, for each medical image of the training set, creating input/target training pairs for training a CNN of the one or more CNNs, where each input/target training pair comprises the input image pair and the target heat map(s).

At 714, method 700 includes training the CNN on the input/target training pairs of the training set. Training the CNN on the input/target training pairs may include learning a mapping from the input image pair to the target heat map(s) for each input/target training pair, where a gradient descent algorithm is used to iteratively adjust one or more weights of the CNN (e.g., via backpropagation) to minimize a difference between one or more output heat maps of the CNN and the target heat map(s). After training the CNN on the input/target training pairs of the training set, the trained CNN may be used by the automated measurement system to predict one or more additional measurement points from one or more user-selected training points in a semi-automatic mode, as described above in reference to FIG. 5.

By following method 700, a plurality of trained CNNs may be created, where each trained CNN of the plurality of trained CNNs corresponds to a training set of the one or more training sets described above (e.g., a CNN for a heart, a CNN for a lung, etc.). In other examples, more than one measurement point may be inputted into the CNN, and training the CNN on the input/target training pairs may include learning a mapping from the more than one measurement point to the target heat map(s) for each input/target training pair, as described above in reference to FIGS. 3A and 5

Thus, the current disclosure provides systems and methods for an automated measurement system for performing an automated measurement of an anatomical feature of a medical image in a semi-automatic mode. In the semi-automatic mode, a user selects one or more measurement points for performing the automated measurement, and the automated measurement system predicts one or more additional measurement points used to perform the measurement based on the one or more user-selected measurement points. In this way, the automated measurement system "autocompletes" a selection of measurement points indicated by the user to perform the measurement. The one or more user-selected measurement points and the predicted additional measurement points may be displayed to the user superimposed on the medical image on a display device, where if the user if unsatisfied with the automated measurement, the user may adjust one or more of the one or more user-selected measurement points and/or the predicted additional measurement points and repeat the automated measurement using the adjusted one or more user-selected measurement points. The one or more user-selected measurement points may also be used to predict measurement points along a boundary of the anatomical feature, where an accuracy of a segmentation task performed on the anatomical feature may be increased as a result of initiating the segmentation task based on one or more user-selected measurement points. The technical effect of initiating the automated measurement based on the one or more user-selected measurement points is that the user may ensure that the automated measurement is performed at a location preferred by or expected by the user, whereby an accuracy of the measurement and/or a subsequent diagnosis or treatment based on the measurement may be increased. An additional advantage of the disclosure is that an accuracy of the automated measurement system when the anatomical feature is deformed may be increased. A further advantage of the methods provided herein is that they may be applied to a variety of different types of measurement, including 2D B-mode measurements, segmentation measurements, Doppler measurements, area measurements, and volume measurements. In spatial measurements, providing a starting point for the automated measurement may allow the user to select where the measurement is performed. In segmentation measurements, providing a starting point for the automated measurement may help an algorithm of the automated measurement system determine how far into tissue to place the segmentation. In Doppler measurements, providing a starting point for the automated measurement may help the algorithm determine a sensitivity parameter. Overall, a desired simplicity and speed of automated measurements is preserved while increasing user satisfaction with the automated measurement by allowing the user to perform a measurement in accordance with a preferred manner.

The disclosure also provides support for a method, comprising: receiving one or more user-selected measurement points for an automated measurement of an anatomical feature of a medical image from a user, predicting one or more additional measurement points for the automated measurement based on the one or more user-selected measurement points and based on a comparison of the anatomical feature of the medical image with a plurality of images of the anatomical feature via a trained network, and performing the automated measurement of the anatomical feature based at least on the one or more additional measurement points. In a first example of the method, the trained network is a convolutional neural network (CNN). In a second example of the method, optionally including the first example, predicting one or more additional measurement points of the automated measurement based on the one or more user-selected measurement points and based on a comparison of the anatomical feature of the medical image with a plurality of images of the anatomical feature via the trained network further includes encoding the one or more user-selected measurement points as a heat map and inputting the heat map into the CNN. In a third example of the method, optionally including one or both of the first and second examples, encoding the one or more user-selected measurement points as the heat map includes receiving the one or more user-selected measurement points from the user as sets of x/y coordinates, and representing each user-selected measurement point of the one or more user-selected measurement point on the heat map as a function of a set of x/y coordinates of the user-selected measurement point. In a fourth example of the method, optionally including one or more or each of the first through third examples, where the function is a 2D normal Gaussian probability density function. In a fifth example of the method, optionally including one or more or each of the first through fourth examples, the method further comprises: rescaling the heat map and the medical image used as inputs into the CNN to align an expected spatial distribution of the one or more user-selected measurement points to one or more physical dimensions of the medical image. In a sixth example of the method, optionally including one or more or each of the first through fifth examples, the CNN is configured to output an output heat map indicating a position of each additional measurement point of the one or more additional measurement points. In a seventh example of the method, optionally including one or more or each of the first through sixth examples, receiving the one or more user-selected measurement points of the automated measurement from the user further includes prompting the user to specify the one or more user-selected measurement points of the automated measurement on the medical image via a user input device. In an eighth example of the method, optionally including one or more or each of the first through seventh examples, performing the automated measurement comprises performing the automated measurement further based on a type of measurement to be performed received from the user via a user input device, and further comprising displaying a result of the automated measurement on a display device and/or storing the result of the automated measurement in memory. In a ninth example of the method, optionally including one or more or each of the first through eighth examples, the method further comprises, after performing the automated measurement, displaying a full set of measurement points and a result of the automated measurement on a display device, the full set of measurement points including the one or more user-selected measurement points and the one or more additional measurement points. In a tenth example of the method, optionally including one or more or each of the first through ninth examples, receiving the one or more user-selected measurement points for the automated measurement from the user further includes performing an initial automated measurement without user input based on the type of measurement, displaying one or more suggested measurement points selected from the initial automated measurement on the medical image, and receiving an adjustment to the one or more suggested measurement points from the user, and setting the adjusted one or more suggested measurement points as the one or more user-selected measurement points. In an eleventh example of the method, optionally including one or more or each of the first through tenth examples, the method further comprises following the automated measurement, prompting the user to accept the automated measurement, responsive to the user accepting the automated measurement, saving the automated measurement to a database, responsive to the user not accepting the automated measurement, prompting the user to adjust one or more measurement points of the full set of measurement points, and repeating the automated measurement using the adjusted one or more measurement points of the full set of measurement points. In a twelfth example of the method, optionally including one or more or each of the first through eleventh examples, the anatomical feature includes part or all of a heart.

The disclosure also provides support for a system, comprising a controller with computer readable instructions stored on non-transitory memory that when executed, cause the controller to, responsive to a user initiating an automated measurement of an anatomical feature of a medical image, prompt the user to select one or more measurement points on the medical image, and responsive to the user selecting the one or more measurement points and initiating the automated measurement: predict one or more measurement points of the automated measurement from the one or more user-selected measurement points, and perform the automated measurement by measuring a distance along a path between the one or more user-selected measurement points and the one or more predicted measurement points. In a first example of the system, predicting the one or more measurement points includes encoding the one or more user-selected measurement points as a heat map, inputting the heat map and the medical image into a model, and receiving the one or more predicted measurement points as an output of the model. In a second example of the system, optionally including the first example, encoding the one or more user-selected measurement points as a heat map further includes encoding the one or more user-selected measurement points as a function of one or more sets of x/y coordinates on the heat map, where each set of x/y coordinates corresponds to a user-selected measurement point of the one or more user-selected measurement points, and the function is a 2D normal Gaussian probability density function. In a third example of the system, optionally including one or both of the first and second examples, the model is a convolutional neural network (CNN). In a fourth example of the system, optionally including one or more or each of the first through third examples, the automated measurement is one of a Doppler measurement, a 2D B-mode measurement, an area measurement, and a volume measurement.

The disclosure also provides support for a method, comprising receiving from a user one or more user-selected segmentation measurement points on a boundary of an anatomical feature of a medical image, based on the one or more user-selected segmentation measurement points, predicting one or more segmentation measurement points on the boundary of the anatomical feature, and performing a segmentation task of the anatomical feature based on a full set of segmentation measurement points, the full set of segmentation measurement points including the one or more user-selected segmentation measurement points and the one or more segmentation measurement points. In a first example of the method, the method further comprises, after performing the segmentation task, receiving from the user one or more adjustments to the full set of segmentation measurement points, and repeating the segmentation task based on the one or more adjustments.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements.

Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method, comprising:
receiving one or more user-selected measurement points for an automated measurement of an anatomical feature of a medical image from a user;
predicting one or more additional measurement points for the automated measurement based on the one or more user-selected measurement points and based on a comparison of the anatomical feature of the medical image with a plurality of images of the anatomical feature via a trained network;
performing the automated measurement of the anatomical feature based at least on the one or more additional measurement points;
following the automated measurement, prompting the user to accept the automated measurement;
responsive to the user accepting the automated measurement, saving the automated measurement to a database;
responsive to the user not accepting the automated measurement, prompting the user to adjust one or more measurement points of a full set of measurement points, the full set of measurement points including the one or more user-selected measurement points and the one or more additional measurement points; and
repeating the automated measurement using the adjusted one or more measurement points of the full set of measurement points; and
responsive to the user accepting the automated measurement using the adjusted one or more measurement points of the full set of measurement points, saving the automated measurement using the adjusted one or more measurement points of the full set of measurement points to the database.

2. The method of claim 1, wherein the trained network is a convolutional neural network (CNN).

3. The method of claim 2, wherein predicting one or more additional measurement points of the automated measurement based on the one or more user-selected measurement points and based on a comparison of the anatomical feature of the medical image with a plurality of images of the anatomical feature via the trained network further includes encoding the one or more user-selected measurement points as a heat map and inputting the heat map into the CNN.

4. The method of claim 3, wherein encoding the one or more user-selected measurement points as the heat map includes receiving the one or more user-selected measurement points from the user as sets of x/y coordinates, and representing each user-selected measurement point of the one or more user-selected measurement points on the heat map as a function of a set of x/y coordinates of the one or more user-selected measurement points.

5. The method of claim 4, wherein the function is a 2D normal Gaussian probability density function.

6. The method of claim 3, further comprising rescaling the heat map and the medical image used as inputs into the CNN to align an expected spatial distribution of the one or more user-selected measurement points to one or more physical dimensions of the medical image.

7. The method of claim 3, wherein the CNN is configured to output an output heat map indicating a position of each additional measurement point of the one or more additional measurement points.

8. The method of claim 1, wherein receiving the one or more user-selected measurement points of the automated measurement from the user further includes prompting the user to specify the one or more user-selected measurement points of the automated measurement on the medical image via a user input device.

9. The method of claim 1, wherein performing the automated measurement comprises performing the automated measurement further based on a type of measurement to be performed received from the user via a user input device, and further comprising displaying a result of the automated measurement on a display device and/or storing the result of the automated measurement in memory.

10. The method of claim 1, further comprising, after performing the automated measurement, displaying a full set of measurement points and a result of the automated measurement on a display device, the full set of measurement points including the one or more user-selected measurement points and the one or more additional measurement points.

11. The method of claim 10, wherein receiving the one or more user-selected measurement points for the automated measurement from the user further includes:
performing an initial automated measurement without user input based on the type of measurement;
displaying one or more suggested measurement points selected from the initial automated measurement on the medical image; and
receiving an adjustment to the one or more suggested measurement points from the user, and setting the adjusted one or more suggested measurement points as the one or more user-selected measurement points.

12. The method of claim 1, wherein the anatomical feature includes part or all of a heart.

13. A system, comprising:
a controller with computer readable instructions stored on non-transitory memory that when executed, cause the controller to:
responsive to a user initiating an automated measurement of an anatomical feature of a medical image, prompt the user to select one or more measurement points on the medical image;
responsive to the user selecting the one or more measurement points and initiating the automated measurement:
predict one or more measurement points of the automated measurement from the one or more user-selected measurement points;
perform the automated measurement by measuring a distance along a path between the one or more user-selected measurement points and the one or more predicted measurement points;
following the automated measurement, prompt the user to accept the automated measurement; and
responsive to the user accepting the automated measurement, save the automated measurement to a database, wherein predicting the one or more measurement points includes:
encoding the one or more user-selected measurement points as a heat map;
inputting the heat map and the medical image into a model; and receiving the one or more predicted measurement points as an output of the model.

14. The system of claim 13, wherein encoding the one or more user-selected measurement points as a heat map further includes encoding the one or more user-selected measurement points as a function of one or more sets of x/y coordinates on the heat map, where each set of x/y coordinates corresponds to a user-selected measurement point of the one or more user-selected measurement points, and the function is a 2D normal Gaussian probability density function.

15. The system of claim 13, wherein the model is a convolutional neural network (CNN).

16. The system of claim 13, wherein the automated measurement is one of a Doppler measurement, a 2D B-mode measurement, an area measurement, and a volume measurement.

17. A system, comprising:
a controller with computer readable instructions stored on non-transitory memory that when executed, cause the controller to:
responsive to a user initiating an automated measurement of an anatomical feature of a medical image, prompt the user to select one or more measurement points on the medical image;
responsive to the user selecting the one or more measurement points and initiating the automated measurement:
predict one or more measurement points of the automated measurement from the one or more user-selected measurement points;
perform the automated measurement by measuring a distance along a path between the one or more user-selected measurement points and the one or more predicted measurement points;
following the automated measurement, prompt the user to accept the automated measurement;
responsive to the user accepting the automated measurement, save the automated measurement to a database;
responsive to the user not accepting the automated measurement:
prompt the user to adjust one or more measurement points;
repeat the automated measurement using the adjusted one or more measurement points; and
save the automated measurement using the adjusted one or more measurement points to a database.

* * * * *